(12) United States Patent  (10) Patent No.: US 8,955,460 B2
Rabinowitz  (45) Date of Patent: Feb. 17, 2015

(54) HORSE HAIR BRAIDING DEVICE AND METHOD

(71) Applicant: Sandra Mary Rabinowitz, Hamden, CT (US)

(72) Inventor: Sandra Mary Rabinowitz, Hamden, CT (US)

( * ) Notice: Subject to any disclaimer, the term of this patent is extended or adjusted under 35 U.S.C. 154(b) by 0 days.

(21) Appl. No.: 14/015,068

(22) Filed: Aug. 30, 2013

(65) Prior Publication Data

US 2014/0000528 A1  Jan. 2, 2014

Related U.S. Application Data

(62) Division of application No. 13/176,522, filed on Jul. 5, 2011, now abandoned.

(60) Provisional application No. 61/361,792, filed on Jul. 6, 2010.

(51) Int. Cl.
*A01K 13/00* (2006.01)
*B68B 5/00* (2006.01)

(52) U.S. Cl.
CPC ...................................... *A01K 13/00* (2013.01)
USPC ............................................... 119/601; 54/78

(58) Field of Classification Search
CPC ....................................................... A01K 13/00
USPC ...................... 54/78; 119/600, 607, 854, 601; 132/212, 273, 274, 275, 276, 53, 200
See application file for complete search history.

(56) References Cited

U.S. PATENT DOCUMENTS

| | | | |
|---|---|---|---|
| 316,310 A | 4/1885 | Ten Eyck | |
| 325,672 A | 9/1885 | Gray | |
| 388,670 A | 8/1888 | Haldeman | |
| 393,979 A | 12/1888 | Neumann | |
| 429,569 A | 6/1890 | Haldeman | |
| 651,764 A | 6/1900 | Mullinix | |
| 721,197 A * | 2/1903 | Jordan | 132/246 |
| 737,601 A | 9/1903 | Felsberg | |
| 940,937 A | 11/1909 | Mason | |
| 2,487,005 A | 11/1949 | Walker | |
| 3,347,018 A | 10/1967 | Laidig | |
| 4,040,390 A | 8/1977 | Rosenbaum | |
| 4,972,660 A | 11/1990 | Black | |
| 5,086,612 A | 2/1992 | Anderson | |
| 5,271,421 A * | 12/1993 | Videtzky | 132/200 |
| 5,279,255 A | 1/1994 | Northcutt | |
| 5,456,272 A | 10/1995 | Johnson | |
| 5,462,020 A | 10/1995 | Trimmer | |
| 5,590,670 A | 1/1997 | Allred | |
| 5,694,750 A | 12/1997 | Allen | |
| 5,727,575 A | 3/1998 | Rontal | |
| 5,730,161 A | 3/1998 | Kohanek | |
| 5,758,670 A * | 6/1998 | Ogunro | 132/210 |
| 5,775,343 A | 7/1998 | Zarn | |
| 5,806,538 A | 9/1998 | Keltner | |
| 5,810,022 A | 9/1998 | Reynolds | |
| 5,899,211 A | 5/1999 | Brown | |
| 6,279,303 B2 | 8/2001 | Sloan | |
| 6,394,037 B1 | 5/2002 | Smith | |
| 7,383,677 B2 | 6/2008 | Penge | |
| 2005/0056298 A1 | 3/2005 | McRoberts | |
| 2007/0181077 A1 | 8/2007 | Jacklin et al. | |

* cited by examiner

*Primary Examiner* — Son T Nguyen
(74) *Attorney, Agent, or Firm* — Lisa J. Moyles

(57) ABSTRACT

According to an aspect of the invention a device for braiding horse hair while minimizing damage to the horse hair is provided. The device includes at least one semi-rigid, resilient material being intertwined with the horse hair into a braid and to form and retain the braid into a decorative shape. In an embodiment, the at least one semi-rigid, resilient material intertwined with the horse hair to form and retain a decorative shape.

7 Claims, 6 Drawing Sheets

HORSE HAIR BRAIDING DEVICE AND METHOD

CROSS-REFERENCE TO RELATED APPLICATIONS

This application claims priority to U.S. Provisional Application No. 61/361,792 filed Jul. 6, 2010, and U.S. application Ser. No. 13/176,522 filed Jul. 5, 2011, both of which are incorporated herein by reference in its entirety.

FIELD OF THE INVENTION

The invention generally relates to a device and method for braiding horse hair, and particularly for device and method for braiding horse hair that forms and retains a decorative shape while minimizing damage to the horse hair.

BACKGROUND OF THE INVENTION

Braiding the manes and tails of horses for horse shows is time consuming. There are various braid styles for different horse show classes that can require from eight to sixty individual braids per horse. Skilled artisans in the field of horse grooming have devised methods and devices for braiding horse manes and tails to make the horse's hair look stylish and to compensate for faults in the horse's physical conformation. In the horse ring, a horse's mane must be clean, trimmed and arranged in an aesthetically pleasing manner. Braids should be tight, sturdy and uniform in width and shape. The proper number of braids should be determined by the size and shape of the horse's neck. Braids act as an optical illusion, drawing the eye to the line of the braids instead of to any irregularities in the top line of the neck.

Past methods for creating braids required the use of needles, a 'pull through' device and thread or yarn. When using thread, the needle must be rethreaded for each braid. Yarn braids require putting in several knots per braid to hold them in place. Traditional "hunter" or "dressage" style braids can be formed with yarn or the thread and needle method.

Once the braiding job is completed, individual braids are often rubbed out of place when the horse scratches its neck on boards or other surfaces. When a braid created with thread or yarn is rubbed out of position it must be undone and rebraided.

Elastic bands are often used instead of thread or yarn to save braiding time, but they can easily be rubbed out by the horse. An additional drawback of using elastic bands is that these are known to tear out hair when removed.

Removal of yarn or thread is time consuming and often damages the horse's mane or tail. The yarn or thread must be cut with scissors or thread rippers before pulling it out of the braid. In doing so hairs are often cut or torn.

In view of the disadvantages associated with currently available methods and devices for braiding horse hair, there is a need for a device and method that easily forms a braid, without the use of tools, which minimizes damage to the horse hair and for which decorative shapes can be easily formed and retained.

SUMMARY OF THE INVENTION

According to an embodiment of the invention, a device for braiding horse hair while minimizing damage to the horse hair is provided. The device includes at least one semi-rigid, resilient material being intertwined with the horse hair into a braid and to form and retain the braid into a decorative shape.

In an embodiment, the at least one semi-rigid, resilient material is folded into at least a first segment and a second segment, the first segment and the second segment extending from a central section of the semi-rigid, resilient material, and the semi-rigid, resilient material is intertwined with the horse hair to form and retain a decorative shape.

In yet another embodiment of the invention, a method of braiding horse hair while minimizing damage to the horse hair is provided. The method includes partitioning the horse hair into at least a first section and a second section, and in a further embodiment, further partitioning the horse hair into at least a third section of hair. Once partitioned, the sections of the horse hair are gathered along with the first segment of the semi-rigid, and another section of horse hair is gathered with the second segment of the semi-rigid, resilient material. The sections of horse hair and the first and second segments of the semi-rigid, resilient material are shaped into a braid and an end of the braid is fastened.

BRIEF DESCRIPTION OF THE FIGURES

A full and enabling disclosure of the invention, including the best mode thereof, to one of ordinary skill in the art, is set forth more particularly in the remainder of the specification, including reference to the accompanying figures wherein.

DETAILED DESCRIPTION

Reference will now be made in detail to the presently preferred embodiments of the invention, one or more examples of which are illustrated in the drawings. Each example is provided by way of explanation of the invention, and is not meant as a limitation of the invention. For example, features illustrated or described as part of one embodiment can be used on or in conjunction with other embodiments to yield yet a further embodiment. It is intended that the invention include such modifications and variations.

In an embodiment of the invention, a device or shaping mechanism and a method for braiding horse hair, in particular manes and tails, is provided, and the device is used and provided in such a way that damage to the horse hair is minimized. In particular, the device includes at least one semi-rigid, resilient material, used for braiding horse hair, in either a folded or unfolded arrangement. In the embodiment shown in FIG. 1, the device 10 is formed from a wire, which may or may not be coated and which is folded or otherwise formed into a first segment 22 and a second segment 24, the first segment 22 and the second segment 24 extending from a central section 20 of the device 10. The first segment 22 has a first end 26, while the second segment 24 has a second end 28.

In an embodiment, the semi-rigid, resilient material is one that is a partly or somewhat rigid, bendable material that is resilient, meaning it is capable of returning to an original shape or position, or near-original shape or position after bending/shaping. The device 10 may be formed of a semi-rigid, resilient material that is formed or made from a wire 12, a plastics material or another suitable material which can be formed or molded or sculpted into a shape and thus retain the shape to which it has been formed. In an embodiment, the formable wire 12 is coated with a material 14, as seen for instance in FIG. 1a, that is not toxic to either the user or the horse and is preferably free of phthalates. In an embodiment, the formable wire includes a coating to provide a slick surface that assists in minimizing damage to the horse hair. Although the semi-rigid, resilient material is preferably malleable and can be repeatedly bent, it is capable of being cut with scissors, for instance. The shaping mechanism or device may come in colors that are close to the color of the horse's mane and tail (or not). Choosing a shaping mechanism that is close in color makes it blend in with the horse's hair and less likely to be seen.

Figures 5, 6, 7:
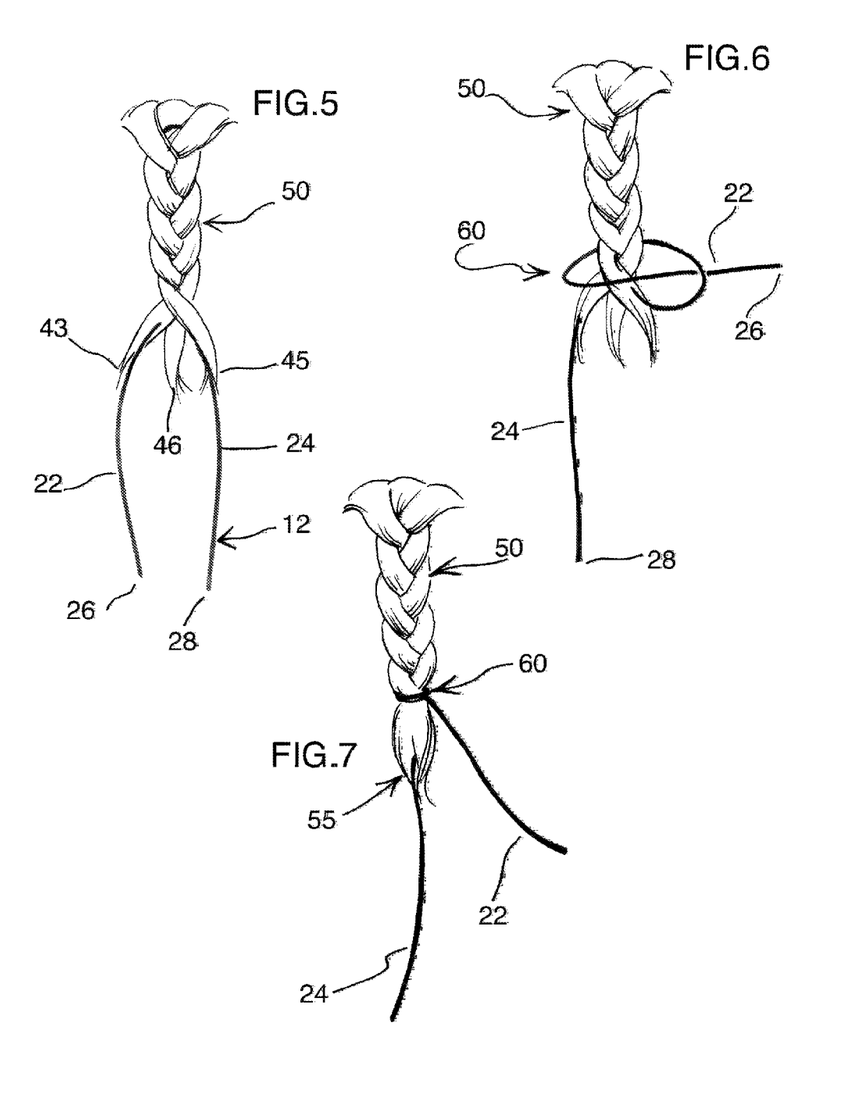
FIG. 5 is a perspective view of a formed braid according to an aspect of the invention.
FIG. 6 is a perspective view of the braid of FIG. 5 showing the fastener.
FIG. 7 is a perspective view of the braid of FIG. 6 showing the tightened fastener.

As described herein, the device 10 is capable of being combined and/or intertwined with the horse hair to form a braid 50, as seen for instance in FIG. 5. In an embodiment, the hair and device are intertwined, twisted, interlaced, or otherwise assembled to form and retain/maintain a decorative shape, as will be discussed in more detail below. When combined with the horse's hair, the shaping mechanism enables the braider to bend braids into desired shapes with his/her hands.

Figures 1, 1A, 2, 3, 4:
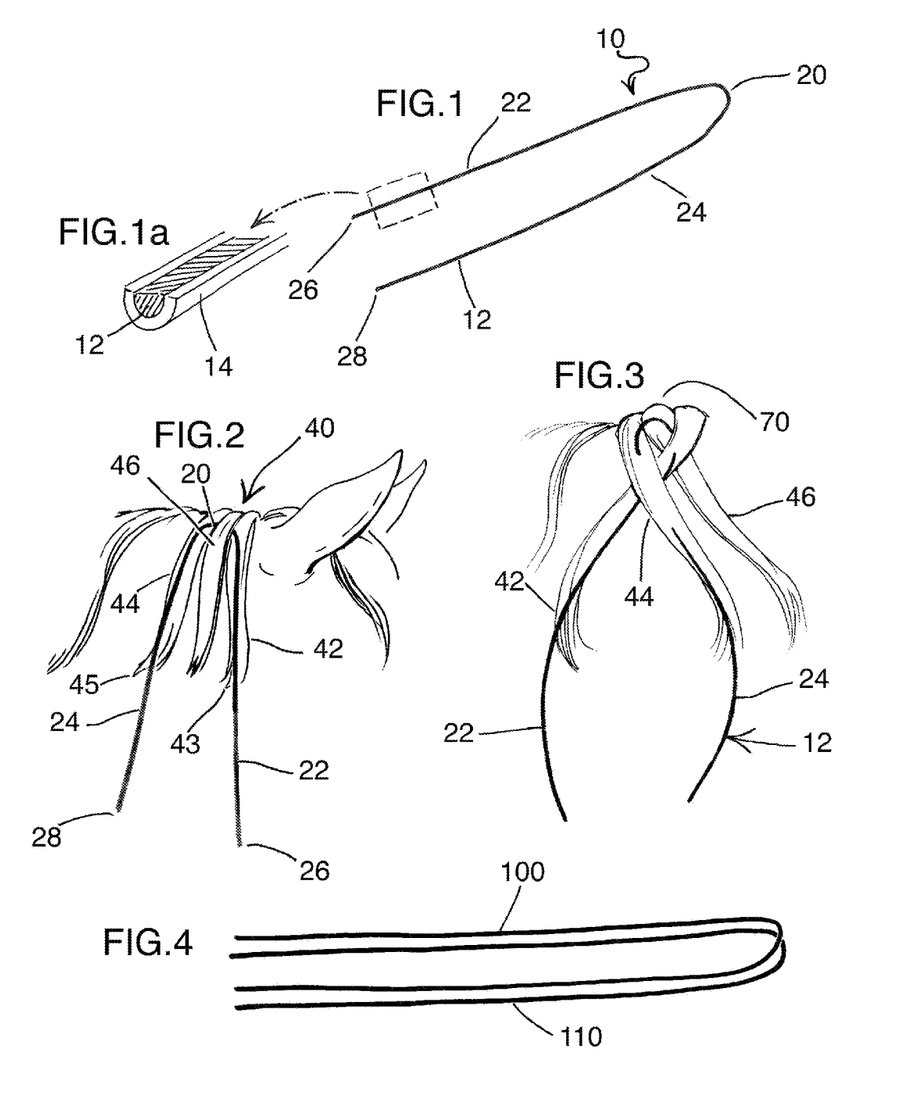
FIG. 1 is a perspective view of a horse hair braiding device according to one embodiment of the invention.
FIG. 1a is a cross-sectional, magnified perspective view of the cutaway box A from FIG. 1, a horse hair braiding device according to one embodiment of the invention.
FIG. 2 is a perspective view of the beginning of a braid incorporating the horse hair braiding device of FIG. 1.
FIG. 3 is a perspective view of further braiding incorporating the horse hair braiding device of FIG. 2.
FIG. 4 is a perspective view of two horse hair braiding devices for use in concert according to an embodiment of the invention.

While the term "braid" or "braiding" is used herein generally to mean that act or finished product when hair is separated into at least three strands, sections, partitions or segments, as seen for instance in FIG. 2, and then methodically intertwined, twisted, interlaced, or otherwise assembled to form a length, it does not preclude the occasion where only two strands or segments of hair are intertwined into a rope twist. Further, although the term "braid" is used herein, it will be understood by one having ordinary skill in the art that the term has the same meaning as the term "plait" or "plaiting" used in British English. As shown in FIG. 2, in an embodiment of the invention, the horse hair 40 is divided or otherwise partitioned into three or more sections: a first section 42, a second section 44 and a third section 46. (Additional partitioning into sections is not shown.) The first section 42 includes a tip 43, and the second section 44 includes a tip 45. One of the improvements identified by the use of the device of the invention is that the braid, once formed, is not easily removed. Further, and as discussed in more detail below, any decorative shape formed with the braid is capable of retaining the shape and/or being molded into a new shape and/or being returned to its molded shape if the shape becomes distorted by, for instance, the horse rubbing against a fence.

In an embodiment of the invention, it is possible to affect a braid regardless of the nature of the horse hair to be braided. As those having ordinary skill in the art will understand, each horse presents a different problem in affecting a braid that will hold its form. For instance, some horses have short, thin, fine hair, while other horses have longer, thicker, more course hair. When referring to the characteristics of the hair, and what defines fine versus course hair, there are generally two different concepts: density and texture. Density refers to the number of hairs in an area, usually expressed as in a square inch. Hair can be described as thick or thin. Thick means a very large number of hairs in an area, thin means very few hairs. Texture refers to the size of each hair shaft. Hair is also generally described as coarse or fine. Coarse means the each hair itself is fat, while fine typically means that each hair is very skinny. Some horses can have any combination of the above, and a varying degree in between. Some may have coarse but thin hair . . . that is, while each hair is fat, there are only a few of them. While another horse may have coarse and thick hair . . . that is, each hair is fat, and there are a large number of hairs. The device and method according to an embodiment of the invention is capable of forming a braid in the horse hair, regardless of the length or texture or density of the hair.

In the event that the section or portion of horse hair to be braided is fine, a single, unfolded device may be used to create the braid. When the horse hair to be braided is of a medium or thicker type, one or more folded semi-rigid, resilient materials may be used. Preferably, the semi-rigid, resilient material forming the device is made of a wire having a gauge over about 20, preferably between about 20 to 26, and more preferably between about 24-26. In an embodiment, the semi-rigid, resilient material is a pliable plastic-coated copper wire.

Figure 9:
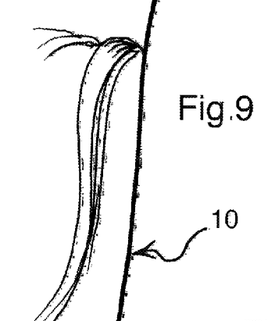
FIG. 9 is a perspective view of still another embodiment of the horse hair braiding device of the invention, showing a single unfolded formable wire for use with fine strands of horse hair and narrow groupings of horse hair used to create smaller braids.

In the embodiment where a fine braid is to be formed, as mentioned above and with reference to FIG. 9, it would not be necessary to fold the device 10 in half. Rather, a single strand, fine gauge of wire 12 intertwined with a single section of the horse hair could be used to form the braid. In other words, narrow groupings of horse hair combined with a single unfolded wire could be used to create smaller braids. On the other hand, in the event that the hair is thicker and/or courser, folding the device 10 in half, as shown for instance in FIG. 1, would be the best way to affect the braid. With reference again to FIG. 2, once the hair has been sectioned into the three sections 42, 44 and 46, the wire 12 is gathered with the hair to form the braid. As shown herein for illustrative purposes only, the first segment 22 of the wire 12 is gathered together with the first section 42 of horse hair, and the second segment 24 of wire 12 is gathered together with the second section 44 of the horse hair, while the third section of hair is not gathered with a segment of the wire 12. It will be understood by those of ordinary skill in the art that it is not necessarily important which segment of the wire is gathered with which section of horse hair. Further, it is not necessary to gather a segment of wire with each section of hair. Rather, in the event that the braid is formed from three sections of hair, it is possible to gather a segment of wire with a section of hair, such that two sections of hair and segments of wire are gathered together, while the remaining section of hair is not braided with an adjacent segment of wire. Once the section of hair and segment of wire are gathered or grouped together, the braiding, or interweaving of the strands of hair begins, as shown for instance in FIG. 3. As the braid is being formed, it is important that the section of hair and the segment of wire remain grouped together so that in the finished braid, the wire is braided/intertwined with the hair.

In the event that the hair is even courser and/or thicker, it may be necessary to provide or use a device 10 that doubles the wire, as seen for instance in FIG. 4. In other words, one piece 100 of the wire is gathered side-by-side with another piece 110 of the wire to increase the strength and/or robustness of the device. The two pieces 100 and 110 are then folded in half to form four segments, and then two parallel segments on one side are combined with a section of hair while the two parallel segments on the other side are combined with another section of hair to affect the braid. In yet another embodiment, it is possible to extend the length of the wire with another wire (not shown) such that the length of the wire is increased. In this way, two or more wires can be attached end-to-end to extend the length of the wire. In this way, the wires are capable of being tied together to form a chain of material.

As seen, for instance, in FIG. 6, once the braid 50 has been formed, the end 26 of first segment 22 is twisted, knotted or otherwise formed into a fastener 60 with the end 28 of the second segment 24, to avoid unraveling of the braid 50. As shown herein, the fastener 60 is formed by tying the first segment 22 with the second segment 24 into a single hitch knot. In an embodiment, the fastener 60 is secured at the end of the braid, by forming a knot. As shown in FIG. 7, it is not necessary to overtighten the knot, as the nature of the materials used only require that the knot be tightened sufficient to maintain the knot.

Figure 8:
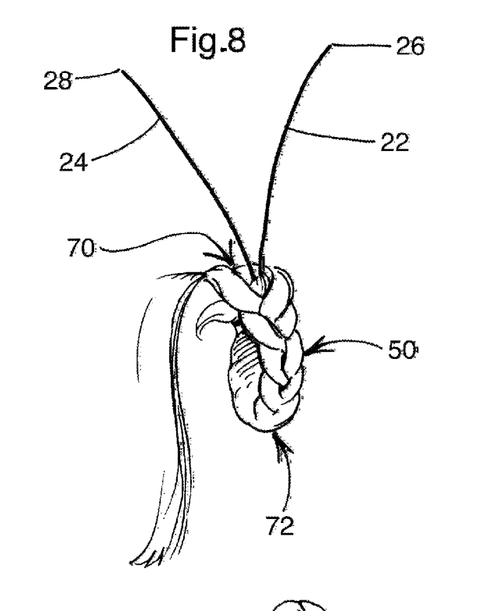
FIG. 8 is a perspective view of the braid of FIG. 7 showing the looped braid.

In an embodiment of the invention, it is desirable to mold, sculpt or otherwise form the formed braid 50 into a decorative shape. As shown for instance in FIG. 8, once the braid 50 has been formed, it is possible to loop the braid 50 by pulling the first end 26 of the first segment 22 and a second end 28 of the second segment 24 together with the braid end 55 (FIG. 7) up towards the base 70 (FIG. 3) of the braid 50 (FIG. 7). The first end 26 and the second end 28 are then pushed up into or poked through the base of the braid 50 and the first end 26 and the second end 28 are pulled through the base 70 of the braid 50 to form a loop 72 in the braid 50. In a preferred embodiment, the ends 26 and 28 are first bent or otherwise formed into a hook-type end, to form a blunted, non-pointy end, (not shown), for ease of quickly pushing the ends 26 and 28 through the base 70 of the braid 50. If the ends are blunted as described, the blunted ends are easily returned to the original, straightened shape once they are pushed through the base of the braid.

Figure 10:
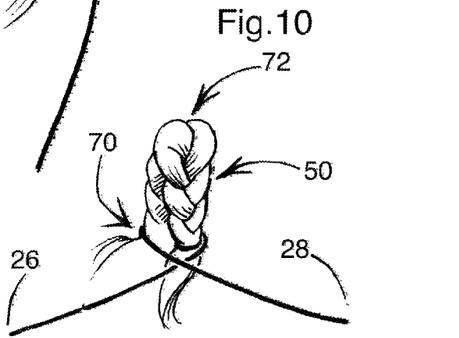
FIG. 10 is a perspective view of the looped braid of FIG. 8 showing ends of the wire according to an aspect of the invention that are crossed under the braid at the base of the braid.
Figure 11:
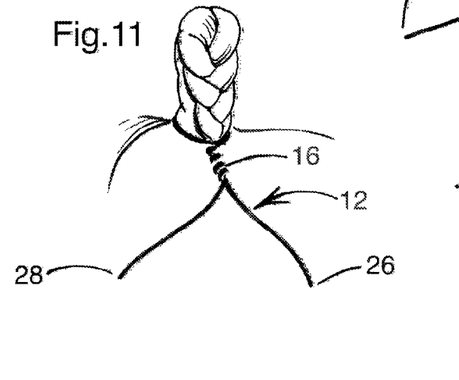
FIG. 11 is a perspective view of the braid of FIG. 10 showing at least one twist formed in the ends of the wires.
Figure 12:
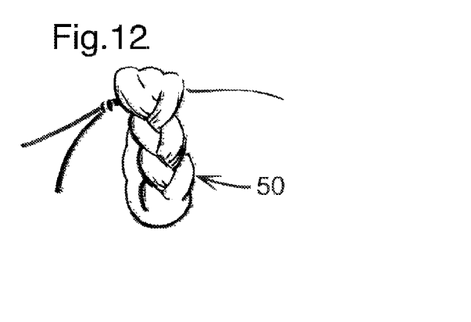
FIG. 12 is a perspective view of the looped braid of FIG. 11 showing the looped braid positioned near the horse's neck.

Once the ends 26 and 28 have passed through the base of the braid, the thus-formed loop 72 is bent away from the horse's neck, so that the ends 26 and 28 are crossed under the braid 50 at the base as shown for instance in FIG. 10. To secure the ends 26 and 28 of the wire 12, it is possible to twist the ends of the wires together 16 in one, or more than one twist, as one would twist a tie, as for instance used to close a plastic bag, as shown in FIG. 11. Preferably, the ends 26 and 28 are twisted together into at least two or more twists 16. More preferably, the ends 26 and 28 are twisted together into at least four twists. Once the looped braid is secured, the braid 50 is once again positioned near the horse's neck as show in FIG. 12, and is ready to be manipulated, molded, sculpted, or otherwise formed into a decorative shape.

Figures 13, 14, 15, 16:
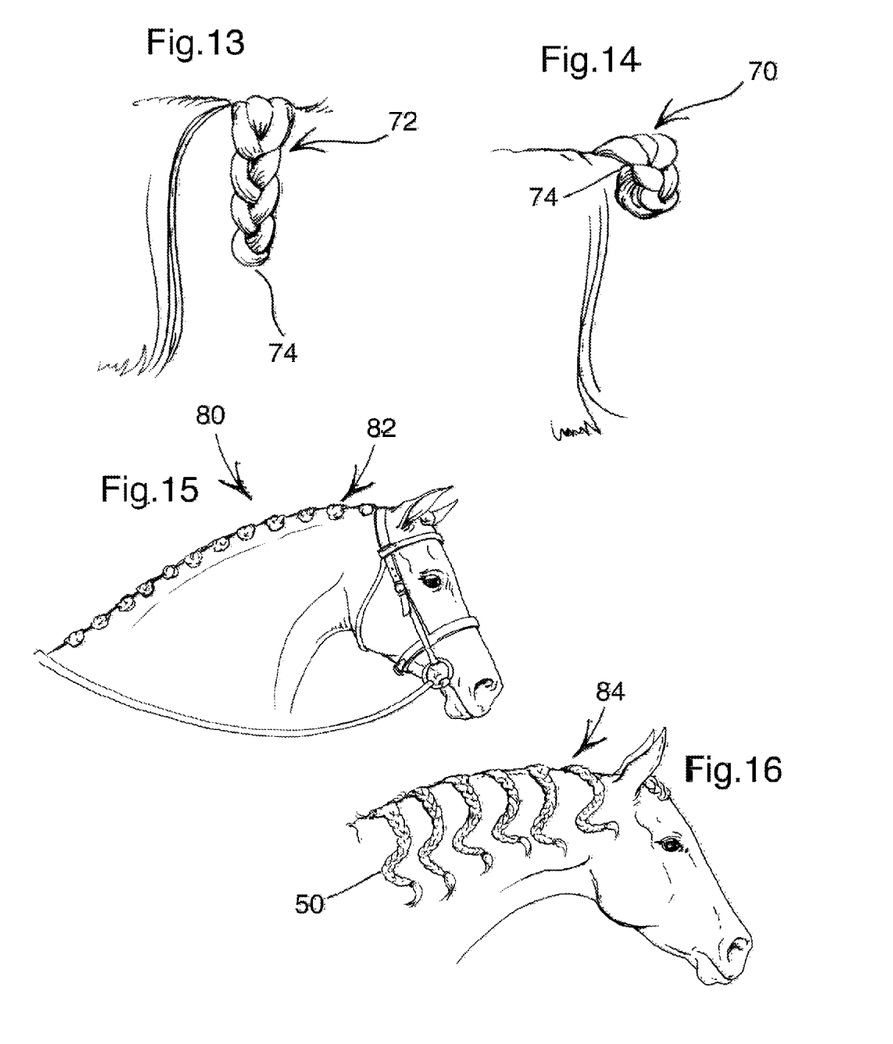
FIG. 13 is a perspective view of the looped braid of FIG. 12, being squished down upon the neck of the horse.
FIG. 14 is a perspective view of a traditional dressage button braid made according to an aspect of the invention.
FIG. 15 is a perspective view of a horse's neck showing a row of button braids made according to an aspect of the invention.
FIG. 16 is a perspective view of another decorative shape according to an aspect of the invention.

Turning to FIG. 13, the ends 26 and 28 have been removed, and the looped braid is positioned and/or flattened against the horse's neck. As mentioned above, the ends 26 and 28 are capable of being removed or cut with scissors. In addition, the ends are capable of being removed with fingernail clippers. In general, any known implement for cutting that can be safely used in proximity to a living being, such as a horse, is contemplated herein. For instance, a box cutter and a knife may not be considered safe for use herein. In an embodiment, a portion of the ends will not be removed, but rather will be tucked into the braid and/or base of the braid, out of sight. In this way, the ends are maintained for ease of removal, and in a way that is not visible and not uncomfortable to the horse. In a preferred embodiment, about a quarter inch of each end will extend beyond the braid end after the remainder of the ends have been removed. As described above for the invention, the braiding technique, using the braiding device, can be repeated as many times as necessary until the entire mane has been braided.

Once the looped braid has been formed, the looped braid can be to be positioned, bent, manipulated, molded, sculpted, or otherwise formed into a decorative shape as seen, for instance in FIGS. 14-16, thus forming a moldable braid. In an embodiment, the end 74 of the looped braid is simply tucked under the braid at the base 70 of the braid. As shown, for instance, in FIGS. 14 and 15, the looped braid can be rolled under itself to create traditional button braids. Alternatively, the braids, without first being formed into a loop, (and also forming a moldable braid), can be styled, as seen for instance, FIG. 16. As shown herein, the braids are formed into a zig-zag shape. In an embodiment, any shape is possible to be formed with the device and method of the invention. Without wishing to be limited, the braid may be formed into at least one of the following shapes: a button shape, a knob braid, a hunter braid, a doughnut or ring shape, a coil shape, a zig-zag shape, a spiked shape, and a scalloped braid.

In an aspect of the invention, the braid is capable of being formed without the use of additional tools. In a preferred embodiment, the only thing required to form the braid and subsequently to create the decorative shape is the horse hair braiding device of the invention, and the hands of the groomer.

Figures 17, 18, 19, 20:
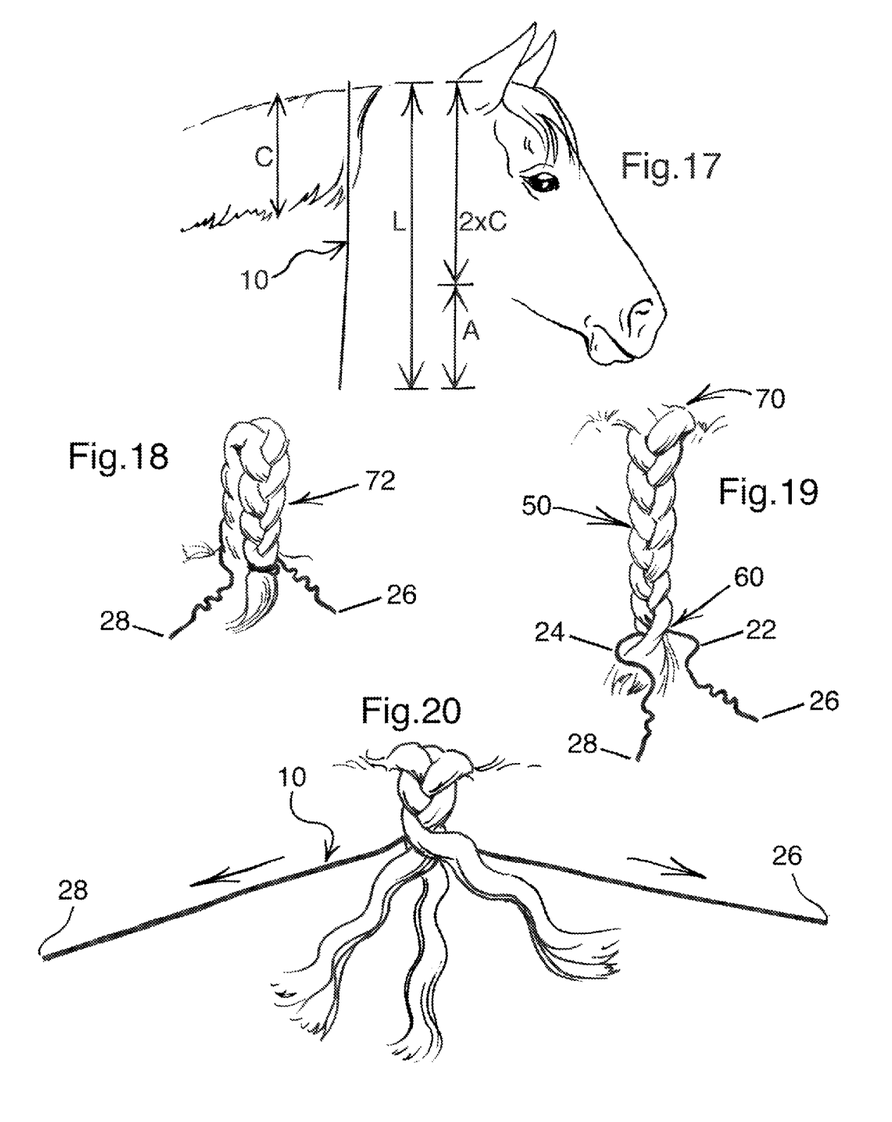
FIG. 17 is a perspective view of the horse hair braiding device length measurement and selection according to an aspect of the invention.
FIG. 18 is a perspective view of the removal of the horse hair braiding device of FIG. 14 according to an aspect of the invention.
FIG. 19 is a perspective view of the further removal of the horse hair braiding device of FIG. 18 according to an aspect of the invention.
FIG. 20 is a perspective view of the further removal of the horse hair braiding device of FIG. 19 according to an aspect of the invention.

With reference to FIG. 17, in an embodiment of the invention, determining the correct or adequate length L of the device 10 to use in forming the braids is necessary. As shown herein, the length L of the device 10 should be at least two times the length of the mane, 2×C, with an additional portion/length A. As an example, if the length of the mane C is 7 inches in length, the length L of the device 10 should be equal to 2×C, or 14 inches, with an additional length A. In an embodiment, the additional length is about 3-6 inches, preferably at least about 5 inches and more preferably at least about 6 inches. In yet another embodiment, the length L of the device 10 is equal to 3×C, with or without an additional length A. Referring again to the example above, the length L of the device 10, would be 21 inches (3 times the length of the mane C).

In another embodiment of the invention, a method for removing the braid is also disclosed. As mentioned above, one of the improvements of the invention over the prior art is the ability to form, retain, and remove the braid while minimizing damage to the hair. With reference to FIG. 18, the molded braid is unmolded, and the twist formed with the ends 26 and 28 of the segments of wire 12 are merely untwisted. The looped braid 72 is removed by backing the ends 26 and 28 out of the base 70 (FIGS. 18 and 19) of the braid 50. The fastener 60 is removed or disassembled, and the hair and wire segments are simply unbraided or unraveled (FIGS. 19 and 20). In an embodiment, it is possible to return the device 10 to its original shape or form, and then to even reuse the same device in another, later braid. In short, removal is quick and efficient, and minimizes damage to the horse hair.

Figure 21:
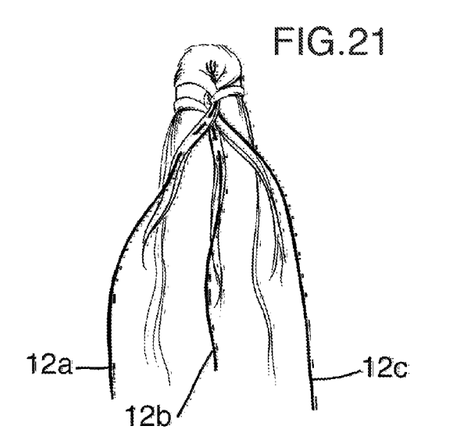
FIG. 21 is a perspective view of the horse hair braiding device according to an aspect of the invention for use in braiding a horse's tail.
Figure 22:
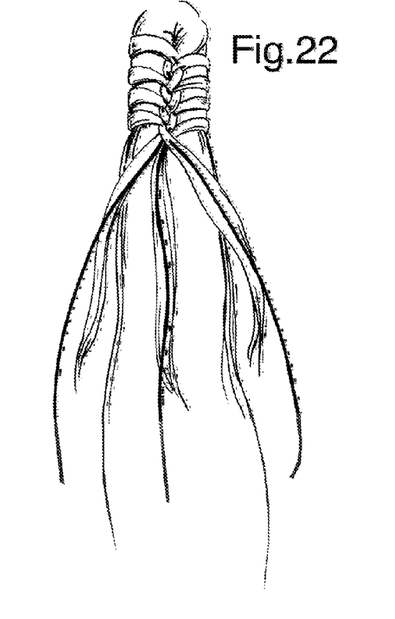
FIG. 22 is another perspective view of a the horse hair braiding device used to braid a horse's tail.
Figure 23:
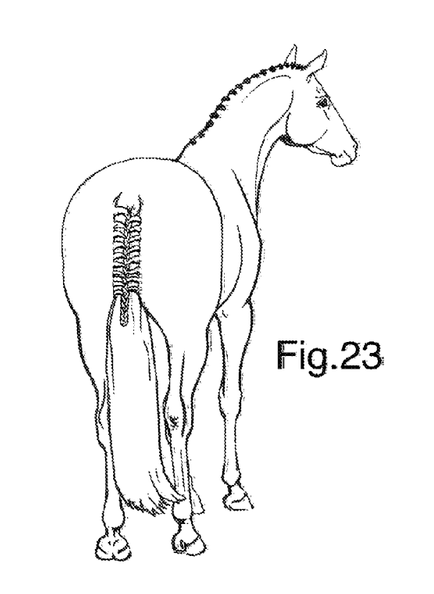
FIG. 23 is yet another perspective view of the braiding device according to an aspect of the invention used to braid a horse's tail.

In an embodiment, it is also possible to use the device to braid a tail of a horse, as seen for instance in FIG. 21. As shown herein, three wires, 12a, 12b, and 12c, are each combined with a section of the hair of the horse's tail. Typically, use of the wires will begin a few inches below where the braiding has begun. In an embodiment, each section or group of hair will utilize a braiding wire running through the section of hair. As shown in FIG. 22, as the braiding proceeds down the tail of the horse, the method encompasses braiding in such a way that the wire is not visible when twisted in with the hair. FIG. 23 shows a completed horses tail braid using the braiding device and method of the invention to form a French-style braid.

Having thus described the invention in detail, it should be apparent that various modifications can be made in the invention without departing from the spirit and scope of the following claims.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of braiding horse hair while minimizing damage to the horse hair, comprising:
partitioning the horse hair into a length of at least a first section and a second section;
gathering and combining the length of the first section of the horse hair along with a first segment of a semi-rigid, resilient material;
gathering and combining the length of the second section of the horse hair along with a second segment of a semi-rigid, resilient material; forming the semi-rigid, resilient material into at least the first segment and the second segment, the first segment and the second segment extending from a central section of the semi-rigid, resilient
shaping the length of the at least first and second sections of horse hair along with the first and second segments of the semi-rigid, resilient material into a braid such that the first and the second semi-rigid, resilient material remains grouped together and combined with the respective length of horse hair section to form the braid;
fastening an end of the braid and thus forming the braid while maintaining the semi-rigid, resilient material within the horse hair; looping the braid by pulling a first end of the first segment and a second end of the second segment together with the braid end up towards a t4ae-base of the braid; and pushing the first end and the second end into the base of the braid and pulling the first end and the second end through the base of the braid to form a loop in the braid.

2. The method of claim 1, further comprising:
further partitioning the horse hair into at least a third section of hair.

3. The method of claim 1, further comprising:
positioning the braid into a decorative shape.

4. The method of claim 3, wherein the positioning of the braid into a decorative shape comprises molding the braid into at least one of a button shape, a knob braid, a hunter braid, a doughnut shape, a coil shape, a zig-zag shape, a spiked shape, and a scalloped braid.

5. The method of claim 3, wherein the positioning of the braid into a decorative shape being performed without the use of additional tools.

6. The method of claim 1, further comprising:
fastening the first end and the second end to retain the decorative shape.

7. The method of claim 1, further comprising:
intertwining the first segment and the second segment of the at least one semi-rigid, resilient material with the length of the first section and the second section of the horse hair respectively to form the braid.

* * * * *

UNITED STATES PATENT AND TRADEMARK OFFICE
CERTIFICATE OF CORRECTION

PATENT NO. : 8,955,460 B2  Page 1 of 1
APPLICATION NO. : 14/015068
DATED : February 17, 2015
INVENTOR(S) : Sandra Mary Rabinowitz It is certified that error appears in the above-identified patent and that said Letters Patent is hereby corrected as shown below:

In the Claims

Column 8, Line 17, Claim 1, insert -- material; -- after "resilient";

Column 8, Line 28, Claim 1, delete the characters "t4ae-";

Column 8, Line 38, Claim 4, delete "3", and insert -- 1 --.

Signed and Sealed this
Fourteenth Day of July, 2015

Michelle K. Lee
*Director of the United States Patent and Trademark Office*